P. T. DODGE.
TYPE CASTING AND COMPOSING MACHINE.
APPLICATION FILED JUNE 28, 1909.
1,081,025.
Patented Dec. 9, 1913.
11 SHEETS—SHEET 1.
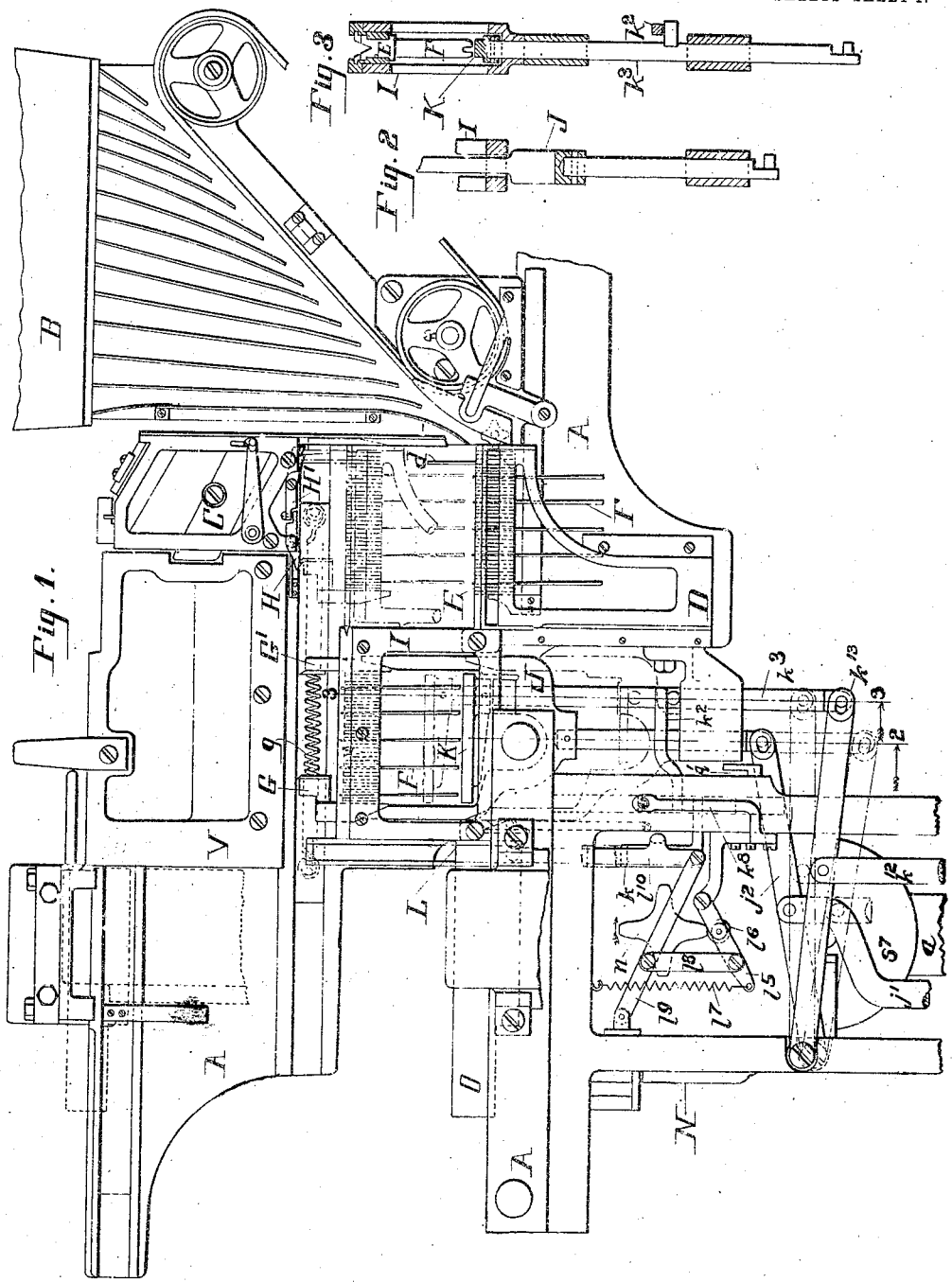
WITNESSES
INVENTOR

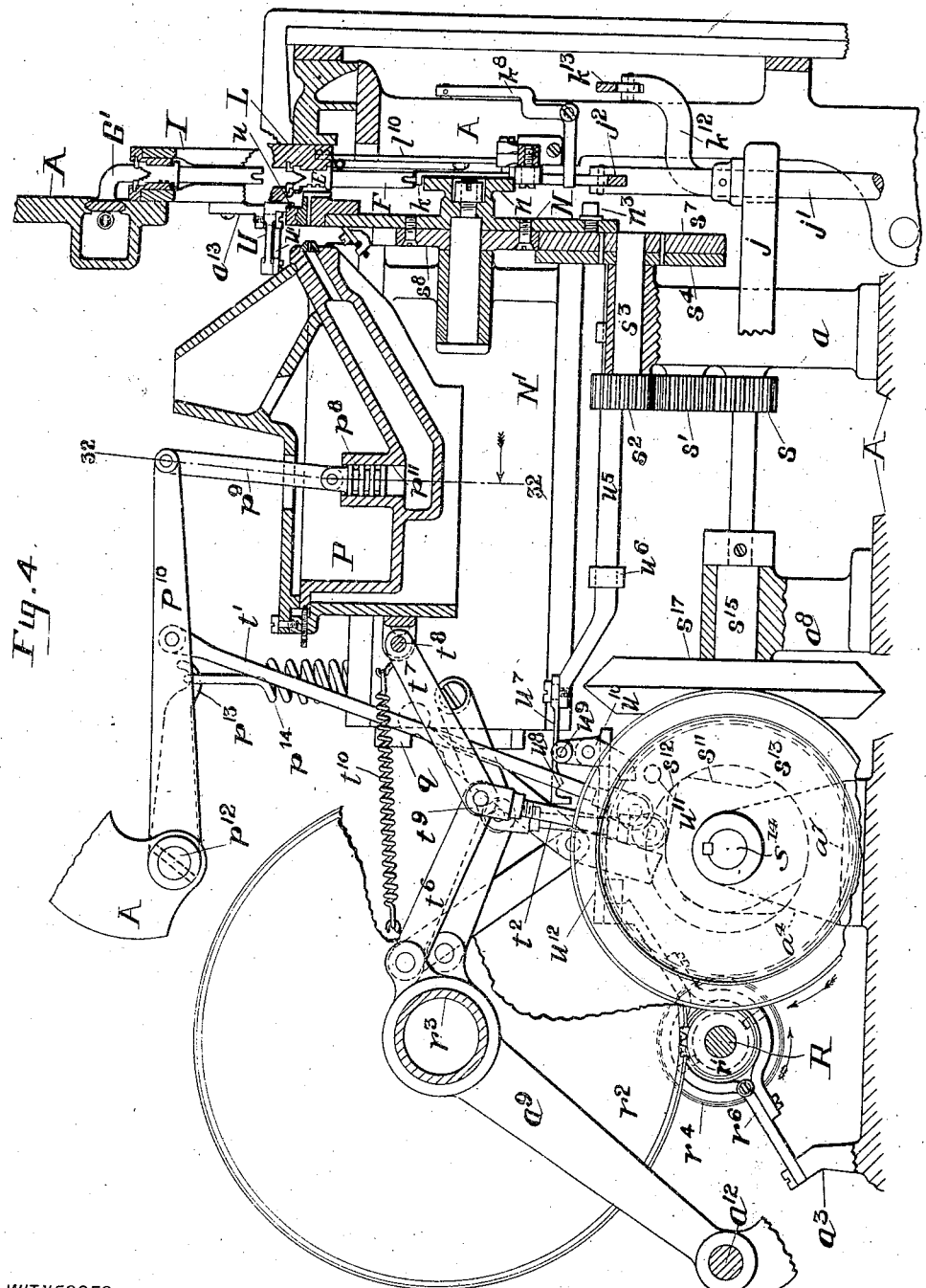

P. T. DODGE.
TYPE CASTING AND COMPOSING MACHINE.
APPLICATION FILED JUNE 28, 1909.
1,081,025.
Patented Dec. 9, 1913.
11 SHEETS—SHEET 3.
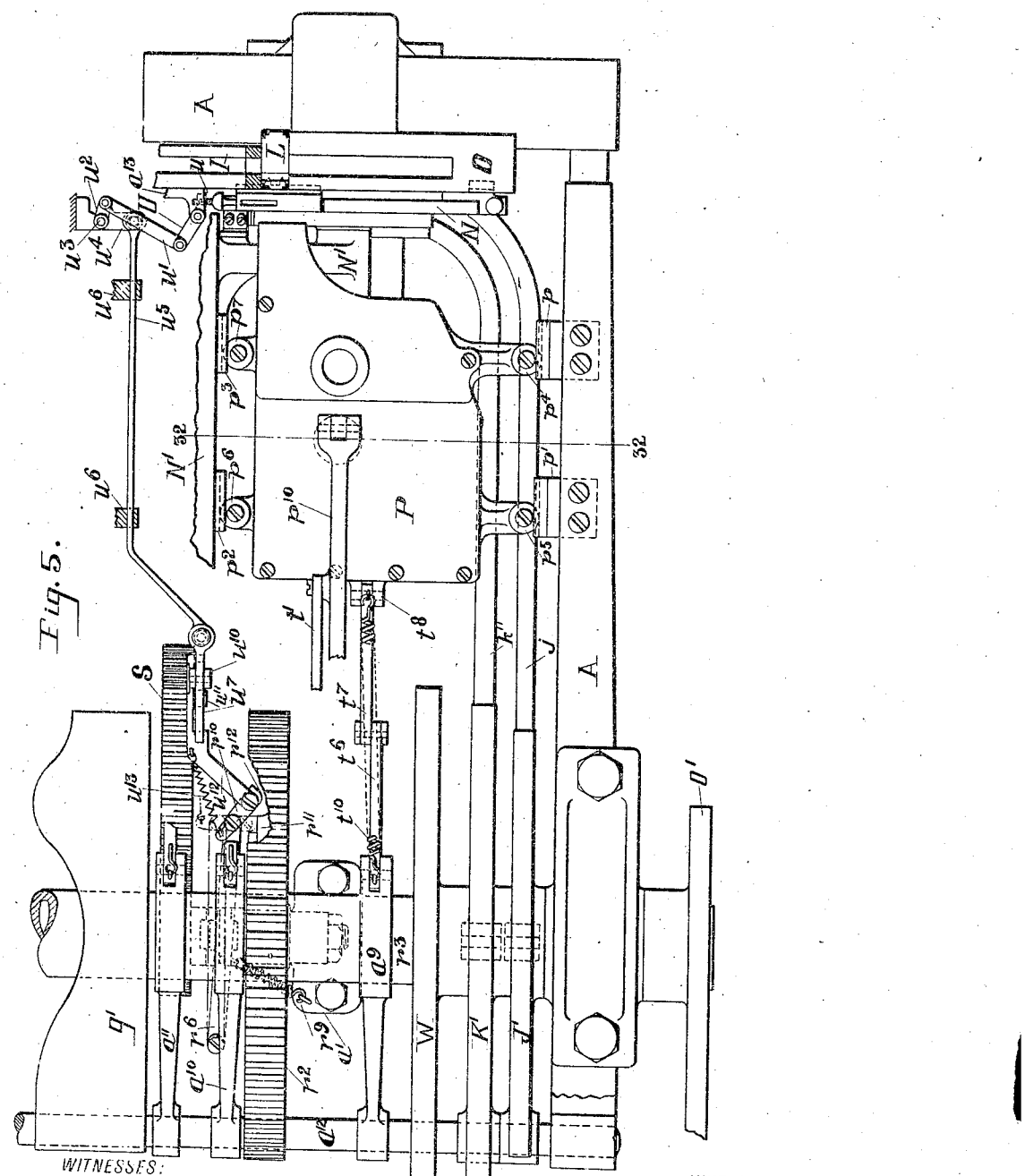
WITNESSES:
INVENTOR

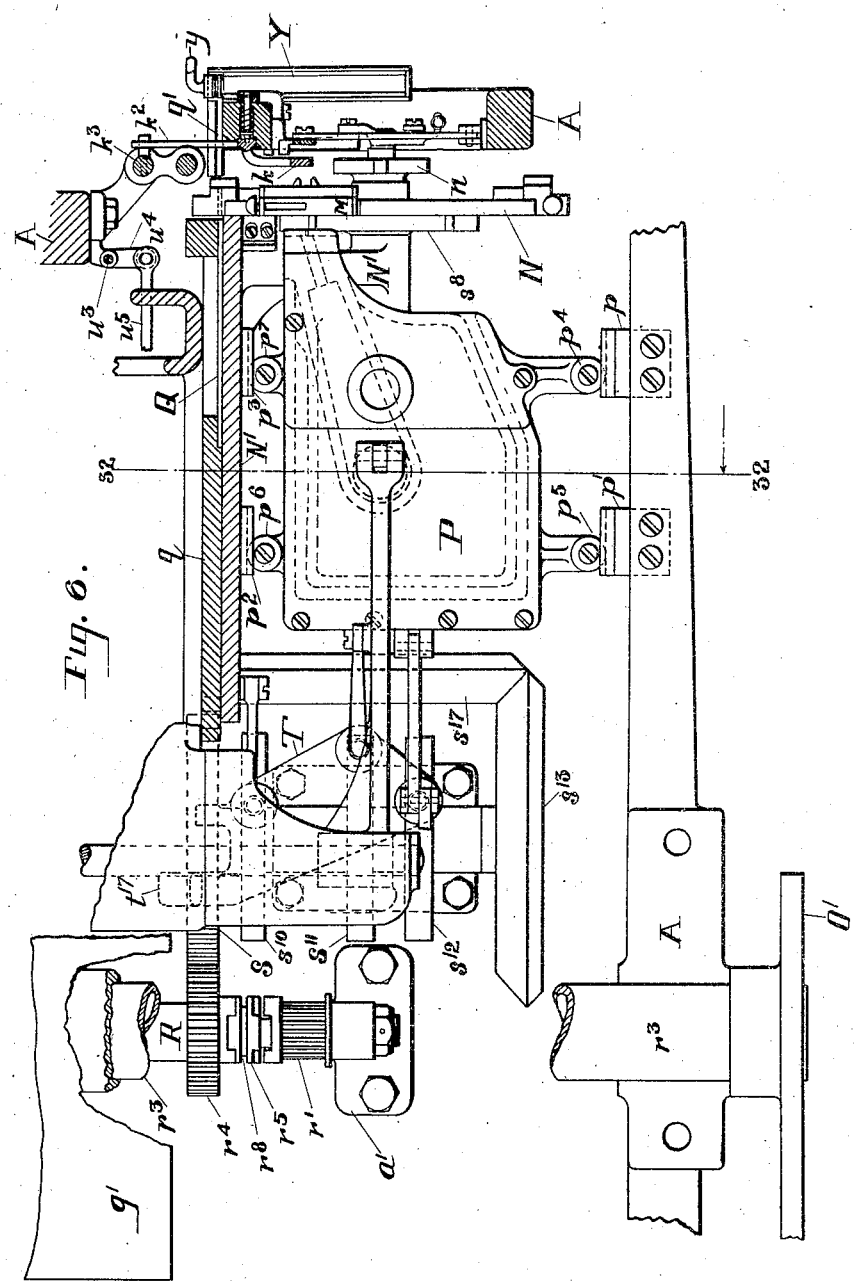

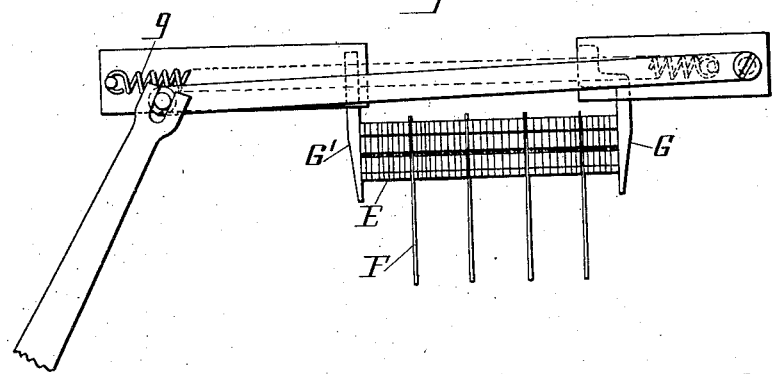
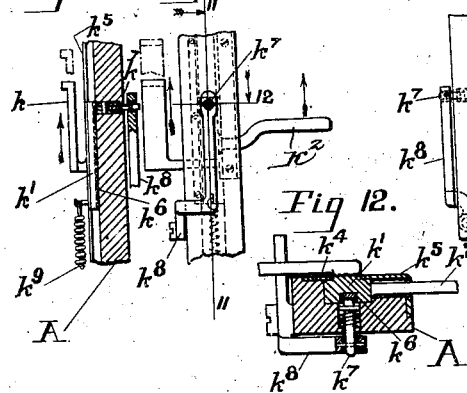
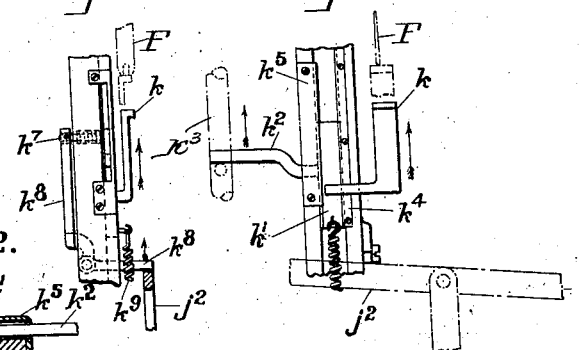
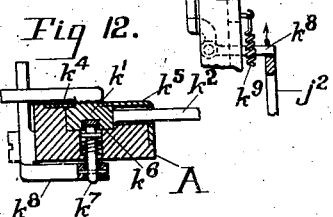
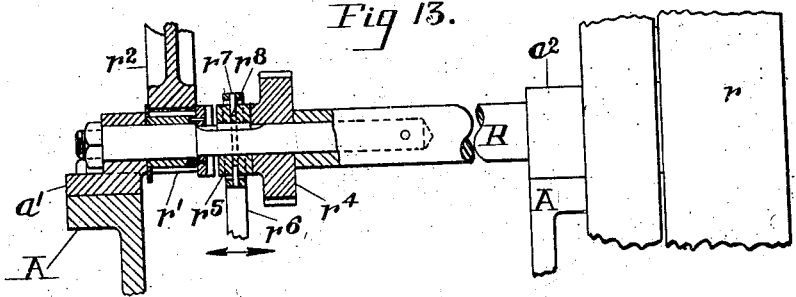

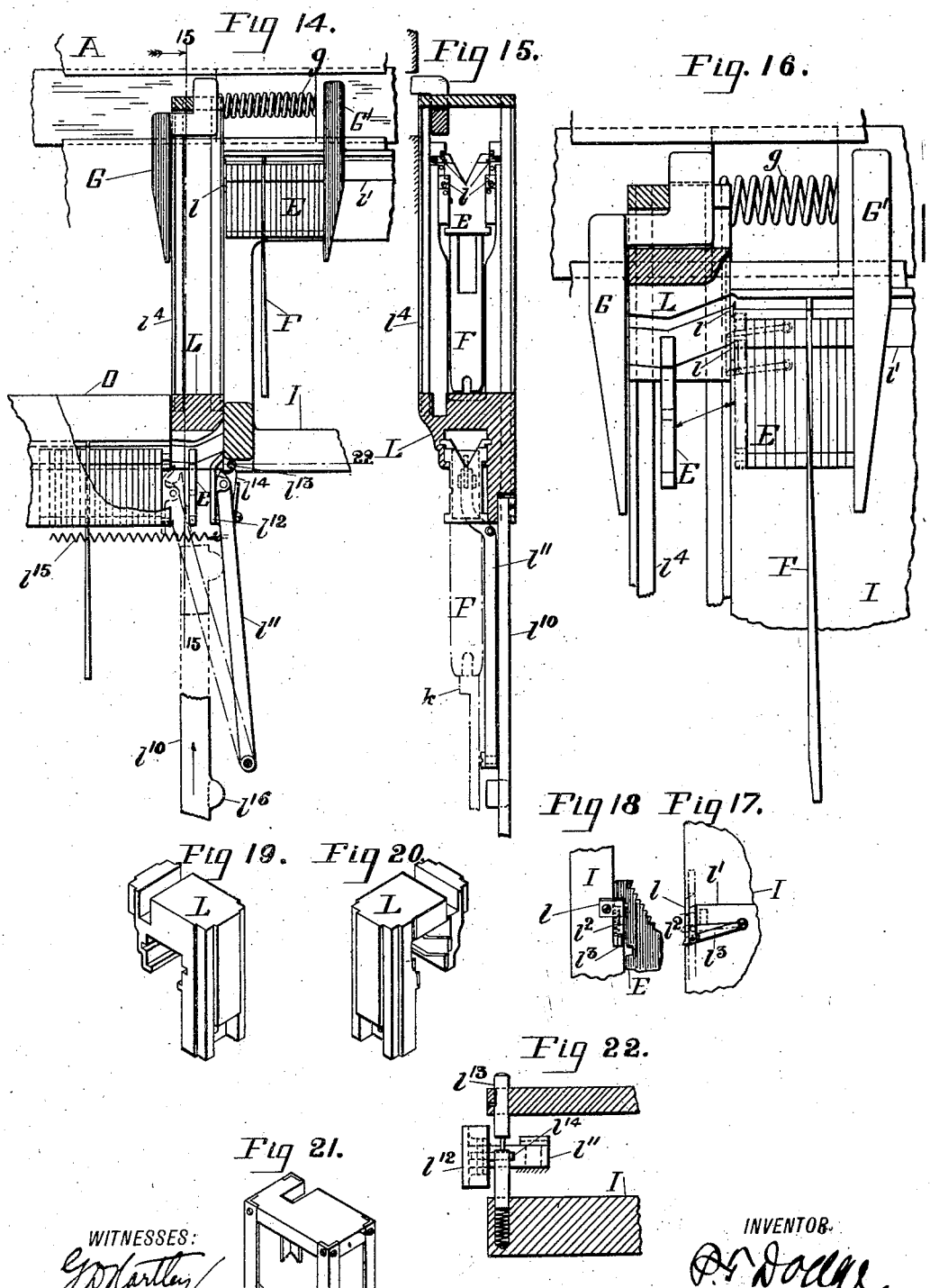

P. T. DODGE.
TYPE CASTING AND COMPOSING MACHINE.
APPLICATION FILED JUNE 28, 1909.
1,081,025.
Patented Dec. 9, 1913.
11 SHEETS—SHEET 7.
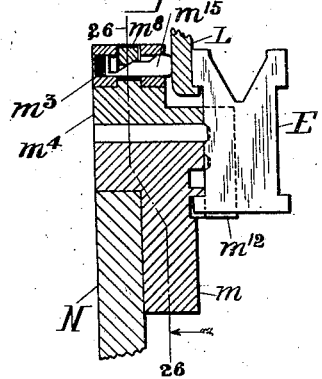
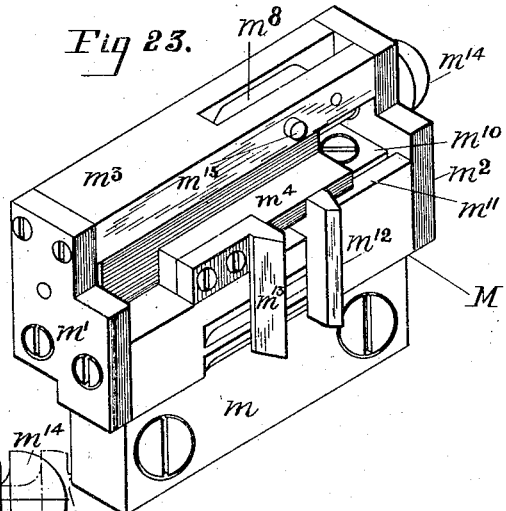
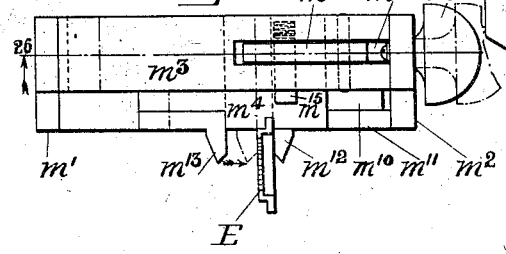
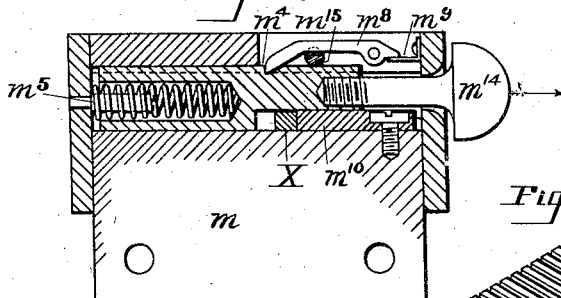
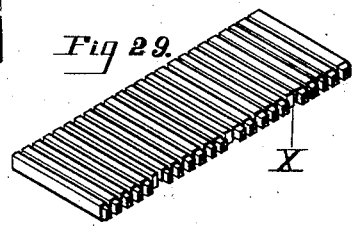
WITNESSES:
INVENTOR P. T. DODGE.
TYPE CASTING AND COMPOSING MACHINE.
APPLICATION FILED JUNE 28, 1909.
1,081,025.
Patented Dec. 9, 1913.
11 SHEETS—SHEET 8.
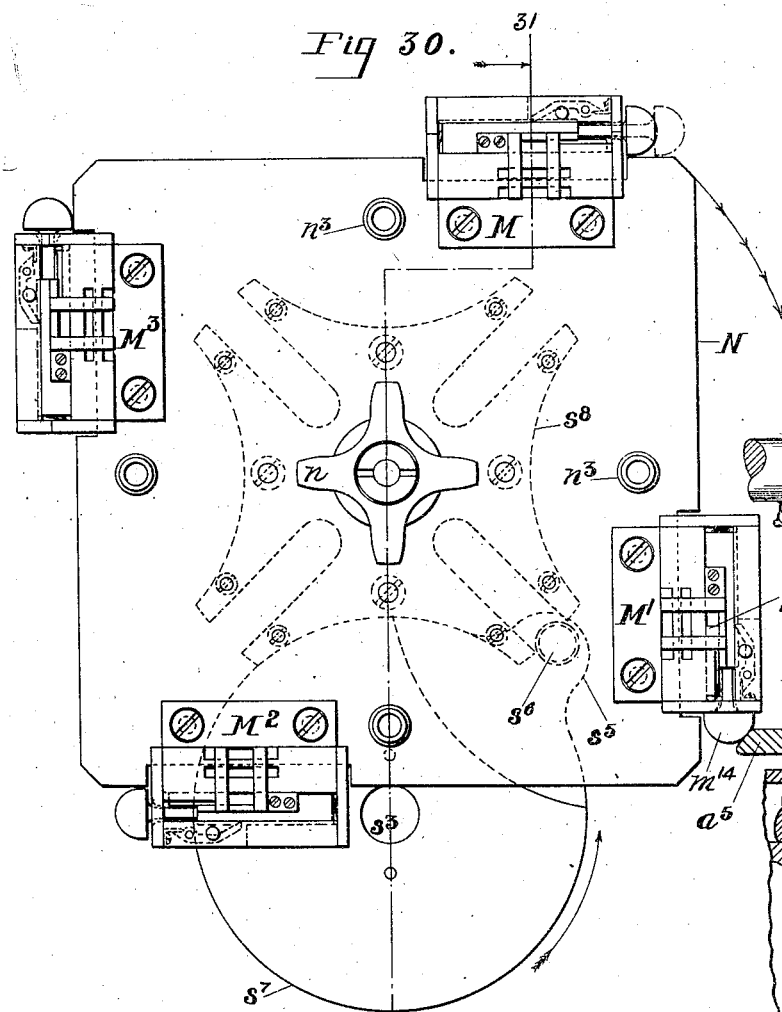
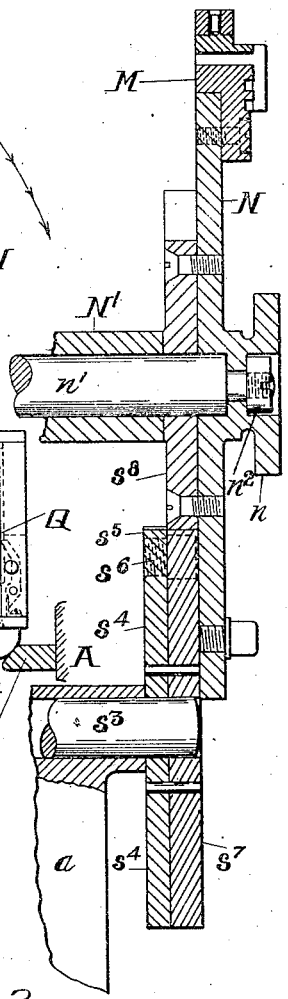
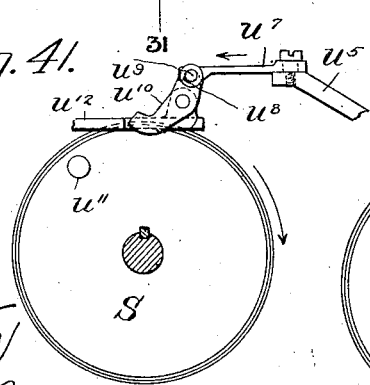
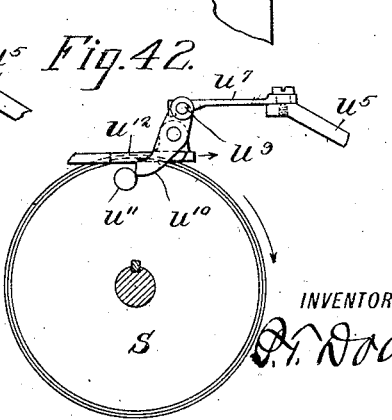
WITNESSES
INVENTOR P. T. DODGE.
TYPE CASTING AND COMPOSING MACHINE.
APPLICATION FILED JUNE 28, 1909.
1,081,025.
Patented Dec. 9, 1913.
11 SHEETS—SHEET 9.
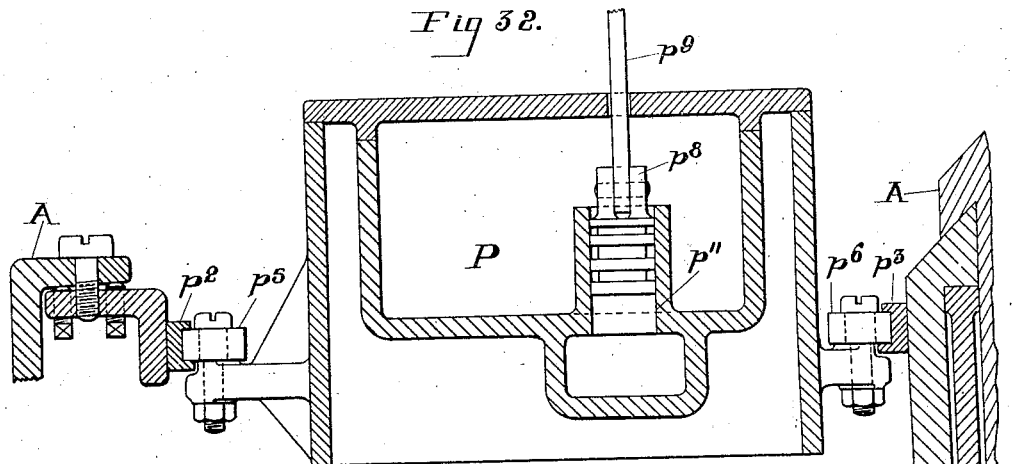
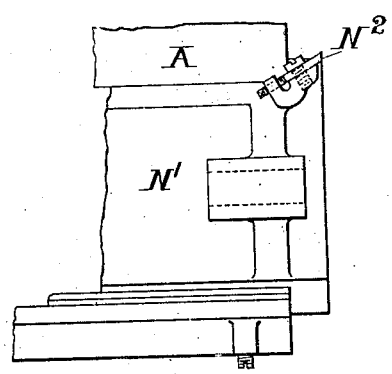
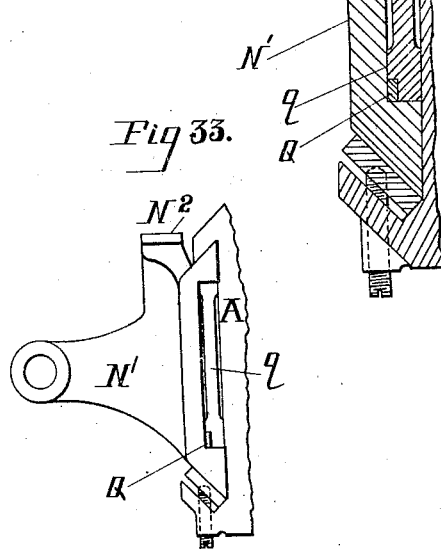
WITNESSES:
INVENTOR

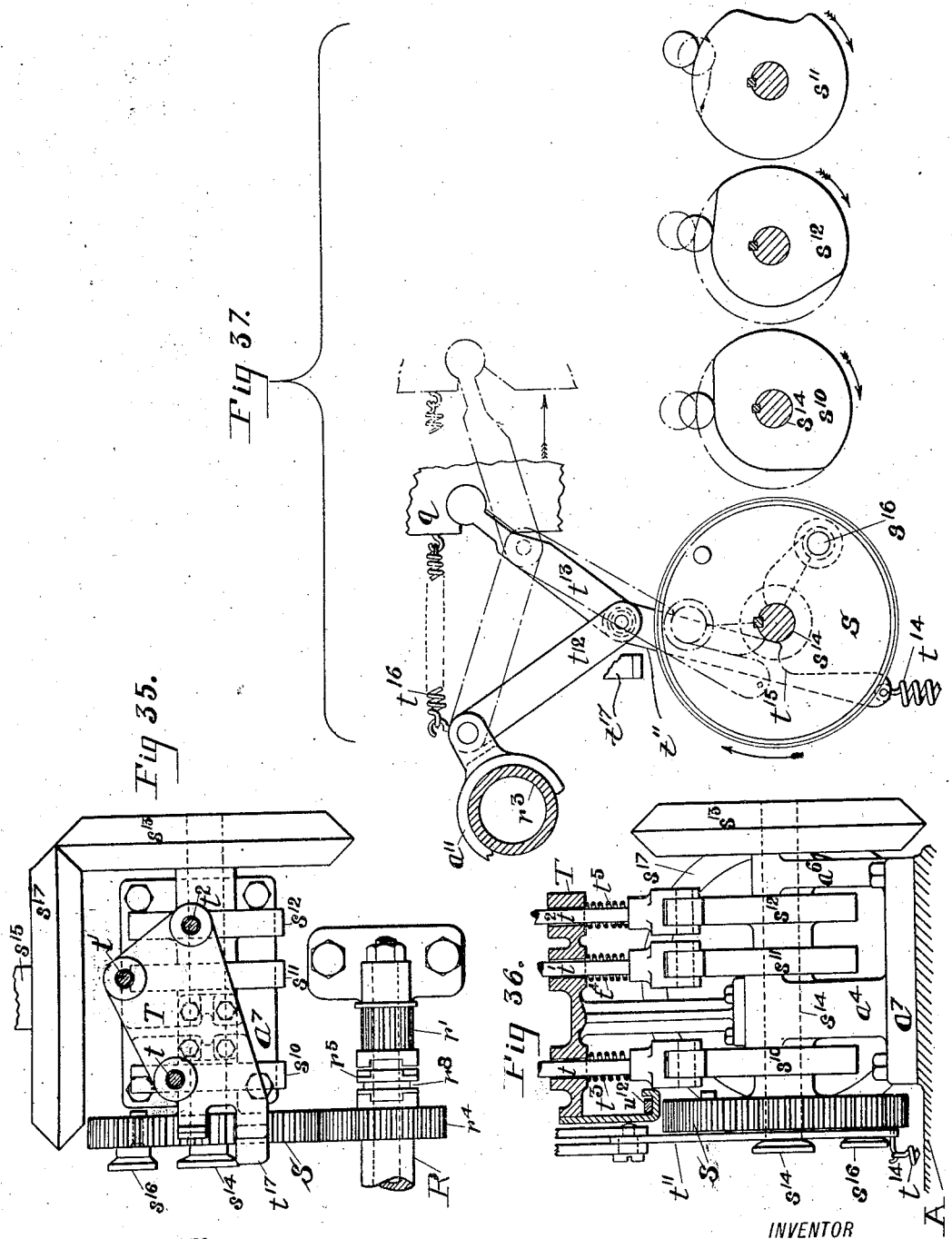

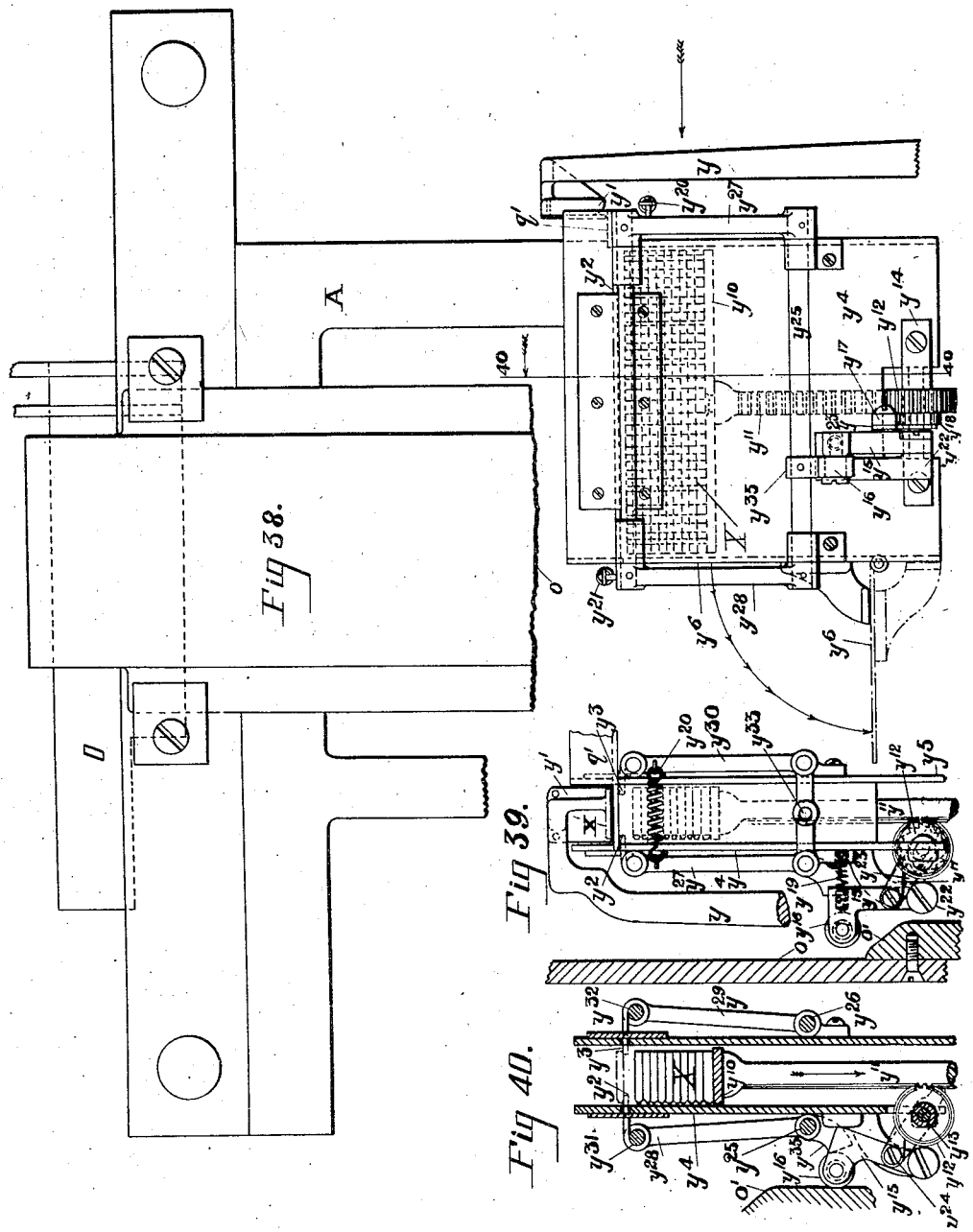

UNITED STATES PATENT OFFICE.

PHILIP T. DODGE, OF WASHINGTON, DISTRICT OF COLUMBIA, ASSIGNOR TO MERGENTHALER LINOTYPE COMPANY, A CORPORATION OF NEW YORK.

TYPE CASTING AND COMPOSING MACHINE.

1,081,025.   Specification of Letters Patent.   Patented Dec. 9, 1913.

Application filed June 28, 1909.   Serial No. 504,720.

*To all whom it may concern:*

Be it known that I, PHILIP T. DODGE, of Washington, District of Columbia, have invented a new and useful Improvement in Type Casting and Composing Machines, of which the following is a specification.

In commercial line casting machines, such, for instance, as are represented in U. S. Patents 436,532 and 557,000, commonly known as linotype machines, matrices bearing individual characters are assembled together with expansible, double wedge spacers in a continuous line; the line is elongated and justified by the relative movement of the wedges in each spacer; and is presented momentarily to close the face of a slotted mold into which molten metal is forced against the matrices to produce a solid or continuous line-printing slug bearing upon one edge the characters in the order in which they will appear in the printed line. In these machines the matrices containing the various characters are of a thickness corresponding to the "set" of the characters therein; or in other words, each matrix is of a thickness equal to the width of the contained character plus its side spaces, technically known as side bearings.

The aim of this invention is to modify machines of this class to produce—instead of continuous slugs—single type and spaces in lines of a uniform and predetermined length; and to produce such type and spaces without using special matrices or special wedge spacers other than those in commercial use in such line casting machines at the present day. To this end I preserve the general organization of the machine as regards the matrices and spacers, and the composing and distributing mechanisms; but I introduce a mold or molds adjustable setwise and such new devices as will, when the composition and justification of the line are complete, justify it, subdivide it into its primary elements or units of single matrices and adjusted spacers, and present each one of such units in succession to the variable mold, in which a type or space corresponding thereto is cast—the adjustment or "set" of the mold being determined by the thickness or set of the matrix or spacer.

It is to be noted as a peculiarity of my mechanism that I utilize the ordinary matrices and spacers, without change or alteration therein, to directly control the adjustment of the mold during their coöperation therewith, so that the resulting type must have precisely the same set: or in other words, the same width running-wise of the line, as the matrix or spacer.

I am aware that a type casting and setting machine has been proposed in which matrices all of one thickness were provided with the characters or matrices proper in their broadside faces, which faces were presented to and widely overlapped the mold. The faces of these matrices were made of variant widths to control the adjustment of the mold, but the width in all cases was greatly in excess of the "set" or width of the character, the matrices being in fact materially different from those used in the linotype machine, and incapable of being presented edgewise to the mold.

In a modified line casting machine such as is here disclosed, the matrices and spacers may be stored in their regular magazines, and the line may be composed in the usual assembling block or elevator by the operation of the ordinary keyboard and magazine-escapement devices; the line is then transferred to the delivery channel and is there justified—the lower wedge of each spacer being driven upward through the line as usual to justify the line to the predetermined length—and held for subdivision into its primary units. So far, the usual driving mechanism has been used to actuate and control the various subsidiary devices. This main mechanism is now arrested and a secondary driving mechanism is thrown into action to effect the line-subdivision, the unit transfer, and the unit casting. This secondary or auxiliary mechanism operates the rotary mold carrier, the casting, and the ejection devices, at the same time effecting the transfer of the single matrices and spacers from one point to another. As each matrix or spacer is carried down from the delivery channel in succession and presented edgewise to the mold, the type or space is cast in the latter, the construction of the mold being such that it automatically determines in consequence of its adjustment by the varying thicknesses of the matrices presented to it the setwise thickness or size of the corresponding type cast within it. After being presented to the mold each matrix and spacer is transferred to the first elevator which, when the casting operations are completed, will contain within it the entire line as assembled. At this point, the secondary mechanism is, in its turn, arrested, and the main driving mechanism resumes its interrupted revolution. The elevator in which the line is stored rises as usual, and the line is disintegrated in the intermediate channel by the regular mechanisms,—the spacers passing into their magazine, and the matrices being elevated to the distributing devices for distribution to their appropriate channels in the magazine.

I believe it to be broadly new to cast in such a modified, commercial line casting machine, from assembled lines of commercial matrices having the characters in their edges and wedge spacers, series of separate types and spaces which will, when assembled, form lines of a uniform and predetermined length. I also believe it to be new to determine the setwise size of the type or spaces cast in the mold, through the automatic adjustment of the mold by the adjusted wedge spacers in connection with matrices having thicknesses corresponding to the widths of the individual type to be produced.

While I have represented my invention as embodied in a commercial Mergenthaler linotype machine of the general organization shown in the above named patents, and have limited the accompanying drawings of my improvements and the related parts of that machine to such only as are necessary to an understanding of the principles and mode of action of my invention, yet I desire it to be understood that I do not restrict myself to those mechanical forms and movements in the terms of which I have expressed my invention, nor do I restrict myself in its application to the Mergenthaler type of line casting machine only.

It will be manifest that the movements and details of the machine may be very widely varied and modified by the skilled designer without departing from the essentials of my invention, and without effecting material change in the results produced.

Referring to the drawings:—Figure 1 is a front elevation of a portion of the machine showing the assembling and line transferring devices, the line-inclosing and justifying mechanisms, and the line dividing device, together with adjacent parts. Figs. 2 and 3 are sectional elevations upon the indicated lines in Fig. 1. Fig. 4 is a vertical section through the machine from front to rear, as viewed from the left hand side of the machine. Fig. 5 is a plan view of the same parts, and Fig. 6 is a similar view with some of the parts removed and broken away for convenience. Fig. 7 is a rear elevation of the line-transfer carriage. Figs. 8, 9 and 10 are respectively front, side and rear elevations of the spacer-elevating-step. and Figs. 11 and 12 are respectively vertical and horizontal sections on the indicated lines in Fig. 8. Fig. 13 shows the driving clutch and shaft in sectional elevation, with the adjacent parts. Fig. 14 shows the line-dividing device in sectional elevation, with its co-operating and adjacent parts. Fig. 15 is a sectional elevation on the line 15—15 in the preceding view. Fig. 16 is an enlarged view of the upper portion of Fig. 14, with the matrix-shift-carriage in its upper position. Figs. 17 and 18 are respectively front and side elevations of one of the fingers for lifting the matrix as the shift rises to receive it. Figs. 19 and 20 are perspective views from each side of the matrix shift carriage. Fig. 21 is a perspective view showing the upper portion of the guide frame for the carriage shown in the preceding figures. Fig. 22 is an enlarged sectional plan on the line 22—22 in Fig. 14, showing the mold-actuated release for the matrix shift finger. Fig. 23 is a perspective view of one of the molds. Fig. 24 is a vertical section through the mold showing a martix in position, and showing the release for the sliding mold cap. Fig. 25 is a plan view on top of the mold. Fig. 26 is a vertical section on the line 26—26 in Figs. 24 and 25. Figs. 27 and 28 are respectively views of the matrix and wedge-spacer used. Fig. 29 is a perspective view of a group of single type as cast in the machine. Fig. 30 is a front elevation of the rotary mold carrier, with the four molds in position upon it. Fig. 31 is a sectional elevation on the line 31—31 in the preceding figure. Fig. 32 is a sectional elevation on the line 32—32 in Figs. 4, 5 and 6. Figs. 33 and 34 are respectively front and side elevations of the mold carrier slide. Fig. 35 is a plan view of a portion of the secondary mechanism. Fig. 36 is a vertical section of the same. Fig. 37 shows the method of actuating the ejector from the gear of the secondary mechanism, together with the cams which operate the other members of the casting mechanism, all in side elevation. Fig. 38 is a front elevation of a portion of the machine showing a galley in position thereon. Fig. 39 is a side elevation of the galley shown in the preceding figure. Fig. 40 represents a vertical section through the galley on the line 40—40 in Fig. 38. Figs. 41 and 42 are side elevations in outline of the device by which the driving clutch is disengaged from the secondary mechanism, and show it with its related parts in different positions.

As the basic elements of my machine I employ a series of circulating matrices and spacers, such as are shown in Figs. 27 and 28, their construction being the same as that of those used at the present time in the commercial Mergenthaler machine. Each matrix has in one edge a character or matrix proper, and in the upper end a series of distributing teeth. Each matrix has thin walls alongside the character, but has a total thickness equal to the "set" or width of the type to be produced therefrom. From opposite edges, at each end, project symmetrical lugs or ears. Each spacer is composed of two oppositely-tapered wedges permanently connected by a sliding joint, one of the wedges being provided with ears whereby it may be locked fast in the line, while its complementary wedge is driven upward endwise through the line, increasing the width of the space in the line occupied by the spacer, and expanding the line in length by a corresponding amount.

Referring to the drawings, A represents the main frame of the machine; B and C represent respectively the matrix and spacer magazines; D represents the assembling elevator, these parts being all such as are used at the present time in linotype machines. The upper portion of the elevator D is horizontally channeled and formed to receive and sustain in the composed lines matrices E and spacers F shown in the various figures.

G and G¹ represent two fingers depending from horizontal slides mounted in the main frame and connected by a contractile spring, $g$, which tends to draw the fingers together. These parts constitute what is commonly known as the "line transfer carriage" and are clearly shown in Fig. 7.

After the line has been composed in the assembling elevator D it is lifted as usual to carry the line upward between the fingers G, G¹, as shown by dotted lines in Fig. 1, the fingers being set apart as usual so that the line may ascend freely between them. As the elevator D completes this upward movement the pin, $d$, thereon raises the detaining pawls H, H¹ out of engagement with the fingers G, G¹; the transfer carriage, holding the composed line between the fingers G, G¹, is now free to be moved to the left by the usual operating devices, thus carrying the line out of the elevator D and into the stationary delivery channel I shown in Fig. 1. The line being thus held at rest in the channel I, the frame J rises to the position shown in full lines in Fig. 1, with its upright side arms in position to embrace or confine the fingers of the transfer carriage during the elongation and justification of the line. When the frame J is in this upper position, the justifying bar K rises and pushes the lower wedges of the spacers F upward through the matrix line, causing the elongation or justification of the line to the prescribed length. As soon as the line has filled out tightly between the confining arms, the resistance of the matrices arrests the rise of the wedges.

The distance through which the bar K rises—that is, the amount of expansion in each wedge spacer—is reproduced in the rise of the step $k$, which occurs at the same time. This step is an extension of a slide $k^1$ which also has an extended portion $k^2$, overlying a projection on the rod $k^3$ which lifts the bar K. As the rod $k^3$ rises to effect through K the justification of the line, it lifts the step $k$ simultaneously and to the same extent. When the rod descends after justification has been completed, the step $k$ remains in its elevated position, and upon its top face the bottom part of each wedge spacer rests during the casting of the space therefrom, as shown in Fig. 15.

The step $k$, with its associated parts is shown in Figs. 8–12. The slide $k^1$ moves up and down in the main frame A and is retained in its groove by plates $k^4$ and $k^5$, overlying its rear face. In its front face is inserted permanently a toothed bar $k^6$, coöperating with a spring-held pin $k^7$ to secure the retention of the step at any elevation to which it is raised by the act of justification. The pin $k^7$ is freely attached to a lever $k^8$ the lower portion of which is pivoted to the frame A and extended into the path of the link $j^2$. The lifting of this link carries the upper part of the pivoted lever $k^8$ away from the frame, effecting the disengagement of the pin $k^7$ from the toothed portion of the slide $k^1$, and leaving the latter free to descend to its lowest and inoperative position. The spring $k^9$, secured at one end to the frame and at the other to the slide, may be used to facilitate this downward movement. It will be seen therefore that immediately before the justification of each line the step $k$ is restored to the lower position.

The justification of the line once effected, the line-confining frame J descends to its lower position, followed by the bar K. The line is then free to be moved by the usual operating devices still farther to the left until the upper ears of the first matrix in the line encounter the shoulders $l$ at the end of the horizontal rib $l^1$ in the channel I. The finger G of the transfer carriage moves still farther to the left, however, until it reaches the position shown in Figs. 14 and 16, in which position a space is seen to exist between it and the first matrix in the line.

The shift carriage L, by means of which the line of matrices and spacers is subdivided into its single units, travels vertically in this space between the finger G and the matrix line to transfer the units to the casting mechanism.

The shoulders, $l$, against which the ears of the first matrix in the line are arrested, are formed by plates secured to the end of the channel I, and arranged to lie in the respective paths of the matrices and spacers alike in such a way as to arrest the line. Immediately before each of these shoulder plates, $l$, is located a vertically-sliding pawl, $l^2$ the upper end of which forms a continuation of the ribs upon which the ears of the matrices and spacers travel in the channel I. The construction of this pawl and its associated parts is clearly shown in Figs. 17 and 18, and is also indicated in Figs. 15 and 16. It will be noted, therefore, that the upper ears of any first unit in the line at any time, matrix or spacer, must always occupy a prescribed position,—being arrested against the shoulder plate $l$, and being immediately over the lifting-pawl $l^2$. This relation of the ear of the line unit to the shoulder plate and lifting pawl is shown in Fig. 18, and the extent of the lifting action of the pawl is shown by dotted lines in Fig. 17.

The pawls $l^2$ are in each case attached to small, spring-retracted levers $l^3$, pivoted in and operating within a recess in the side walls of the channel I, and having a free end projecting slightly into the path of the shift carriage L. In each of its upward movements, the shaft carriage encounters this projecting end and carries it upward with it, thereby elevating the lifting pawls $l^2$, and with them the first unit in the line. As soon as this first unit is lifted sufficiently to allow its ears to clear the detaining shoulder plates $l$, the pressure of the rest of the line behind it caused by the tension of the spring $g$, drives it forward into the shift carriage as shown in Fig. 16. In the carriage it is sustained in a pendant position, its upper ears resting upon suitably disposed shoulders or ribs. The transfer of the unit thus accomplished, the shift carriage descends to present the unit to the casting mechanism, and the lever $l^3$ retracts the lifting pawl $l^2$ thus allowing the next unit in the line to bank against the detaining shoulder plates $l$. This line-subdividing and unit transferring operation is repeated successively for each separate unit in the line.

L represents the shift carriage, shown variously in Figs. 4, 5, 14, 15 and 16, and illustrated perspectively in Figs. 19 and 20. As has just been described, this shift operates vertically to transfer the line units from the channel I to the casting mechanism, and is inclosed between a series of vertical guides $l^4$ secured in part to the machine frame A and in part to the end of the channel I, and united at their upper ends as shown in Fig. 21.

The actuating device for effecting the movements of the carriage L is clearly shown in Fig. 1. Projecting from the front face of the rotary mold carrier N is a four-point cam, $n$, secured to the carrier and rotating with it. Immediately below this cam, and pivoted to a bracket extending from the frame of the machine, is a vibrating lever $l^5$ carrying a cam-roll $l^6$ which is kept in constant engagement with the peripheral face of the cam $n$ by means of the contractile spring $l^7$, secured to the outer end of the lever $l^5$. The movement thus derived from the varying contour of the cam face in motion is communicated through the link $l^8$ to the second lever $l^9$, and from it, by means of the link connection $l^{10}$, to the shift carriage L. The mold carrier N has mounted upon it four separate molds, and makes one-quarter of a revolution for each complete cycle of casting operations, thus effecting through the four-point cam, $n$, one complete upward and downward transfer movement of the shift carriage L for each casting cycle.

N represents the rotary mold carrier which, together with its four separate molds and its intermittingly actuating connections, is clearly shown in Figs. 30 and 31, as well as in the general views shown in Figs. 4, 5 and 6. The carrier N is mounted as usual in the mold slide $N^1$, the latter being free to reciprocate to and fro as is customary in machines of this kind, and being actuated and controlled in this reciprocating movement by mechanism to be described hereafter. The carrier is secured in place upon the slide $N^1$ by the pin $n^1$ and the nut $n^2$, being free to rotate thereon as desired. Locating bushings $n^3$ of the usual type are mounted in suitable positions upon the front face of the carrier to aline it in its forward movement upon the complementary dowels in the main frame. Upon this carrier are mounted the molds M, $M^1$, $M^2$, and $M^3$, in such relation to the adjacent and coöperating mechanisms and devices that, while the mold M in the upper position (see Fig. 30) is presented to the line-unit held in the shift carriage L for casting, the mold $M^1$ is presented simultaneously to the ejector Q to permit of the ejection of the type cast in the previous cycle of operations.

The intermitting rotation of the carrier N is produced as follows: A train of gearing consisting of a driver $s$, the idler $s^1$, and the driven gear $s^2$, shown in Fig. 4 supported by the bearing, $a$, behind and below the carrier N, and actuated by driving mechanism to be described hereafter, makes one complete revolution for each cycle of casting operations. To one end of the shaft $s^3$ is fastened the driven gear $s^2$ while to the opposite end is secured the circular driving disk $s^4$, to an extended portion of which, $s^5$, is attached a driving pin $s^6$. To the driving disk $s^4$ is secured the circular locking disk $s^7$. On the rear face of the mold carrier N is fastened the coöperating follower $s^8$ shown in dotted lines in Fig. 30. The edge of this follower is so formed as to interlock with the engaging edge of the disk $s^7$ at appropriate intervals, suitable recesses or slots being also formed in it at the same intervals to mesh with the driving pin $s^6$. The motion of the gear $s^2$ causes the driving disk $s^4$ to engage the follower $s^3$, the driving pin entering one of the long slots in the latter as shown in Fig. 30, and producing a quarter turn of the follower. The driving pin $s^6$ having passed out of the long slot in the follower, and the locking disk $s^7$ having engaged with its edge the corresponding edge of the latter, the further rotation of the driving disk does not for the remainder of its movement cause any rotation of the mold carrier N. The carrier remains locked in the position in which it has been left by the driving pin until the latter completes its revolution and again engages the follower in the next slot. It will thus be obvious that for each full revolution of the driving disk $s^4$, the mold carrier makes one quarter of a turn; and it will be noted also that owing to the manner in which these coöperating parts are formed the forward movement of the carrier during its idle intervals does not disengage the follower $s^3$ from the locking disk $s^7$.

The molds M, $M^1$, $M^2$, $M^3$, are of similar construction, and are clearly shown in Figs. 23–26. To the body portion $m$ is secured at each end of the mold uprights $m^1$ and $m^2$, to which and between which is fastened the cover plate $m^3$. The cap portion $m^4$ slides horizontally between the body $m$, and the cover plate $m^3$, a projecting key on the cap and a corresponding groove in the cover plate serving to guide and regulate this to and fro movement of the cap. A suitable spring $m^5$ placed in a recess in the cap, tends constantly to force it toward the right and to thus close the mold cell, as shown in Fig. 26. The pressure of the spring $m^5$ is resisted by the detaining pawl $m^8$, pivoted in the cover plate $m^3$, and having one end formed to engage in a recess in the sliding cap, while a spring $m^9$ beneath the opposite end tends to make the pawl preserve this engagement.

The right hand mold liner $m^{10}$ is attached to the mold body by a screw or similar fastening, the mold body having raised ribs or projections $m^{11}$ front and back of the liner to preserve its alinement. The front edge of the liner is extended at one side to form the vertical jaw $m^{12}$, projecting in front of the mold and extending above and below the plane of the mold cell. A similar jaw $m^{13}$ is secured to the sliding cap, by means of screws or other fastenings. The inner faces of these jaws are in line with the corresponding faces or ends of the mold cell, and contact with one another when the mold cell opening is closed.

When any one of the molds has been moved by the carrier to the upper or casting position, ready for presentation to the line unit in the shift carriage L, the mold cell is always open to the full width, as shown in Figs. 25 and 26. As the mold begins to advance upon the line unit the release pin $m^{15}$ in the cover plate, encountering the rear vertical face of the carriage L, as shown in Fig. 24, is driven backward and in doing so engages with its beveled upper face the similarly beveled under face of the detaining pawl $m^8$ in such a way as to disengage the pawl from the sliding mold cap $m^4$. Under the pressure of the spring $m^5$ the cap slides to the right, thus clamping the line unit firmly between the projecting jaws $m^{12}$ and $m^{13}$ and contracting the mold cell in width to register exactly with the width of the line unit. I have shown in Fig. 25, this relation of the line unit and the two clamping jaws, and have also indicated the movement of the jaw attached to the sliding mold cap by full and dotted lines.

It will be noted that the mold is thus so constructed that the sliding cap adjusts itself automatically to the varying thicknesses of the matrices or spacers; and that the setwise size of the type or space cast in the mold is thereby determined automatically in each case by the thickness of the line element itself. It is also to be noted that the same matrix surfaces and dimensions which are utilized in justifying the line are used to determine the adjustment of the mold. In other words, the thickness of the matrices and adjusted spacers determines the length of the line and also determines the adjustment of the mold, no additional or special surfaces or dimensions being required for the purpose.

A ram represented by $m^{14}$, and consisting of a short stiff rod terminating outside the mold in a circular mushroom head, is attached to one end of the sliding mold cap, the rod passing through a suitable opening in the end upright $m^2$. Sufficient clearance exists between the bottom part of the head and the exterior face of the upright $m^2$ to allow the sliding cap to be moved back against the spring pressure far enough to permit the engagement of the detaining pawl $m^8$ with its coöperating slot in the top face of the mold cap. During the progress of the mold from the casting to the ejecting position, a wiper $a^3$, suitably placed upon the frame of the machine in the path of this projecting ram $m^{14}$, engages it and drives it inward, thus restoring the sliding mold cap to its former position. The mold is thereby presented in the ejecting position with the mold cell wide open, and the use of a full width ejector blade is thus permitted at all times. During this quarter-turn of the mold carrier N between each casting operation the mold containing the type is carried past the stationary knife $N^2$ mounted upon the mold slide $N^1$ as shown in Figs. 33 and 34 in such proximity as to trim the foot of the cast type flush with the mold. The type or space is thus given a square, true foot; and is brought to the regular standard type-height.

The ejector, Q, shown in front elevation in Fig. 33 and in section in Fig. 6, consists as usual of a thin metal blade secured detachably to a supporting and following slide $q$, the combined member being reciprocated as usual within a suitable groove recessed in the inner face of the mold slide $N^1$, by means to be described hereafter. The type is driven in the ordinary way out of the mold and down the channel $q^1$ into the galley. This type ejecting operation takes place simultaneously with the casting of the succeeding type.

While the mold is withdrawing from the line unit immediately after casting, and just before the shift carriage L begins to ascend, the line unit is transferred from it to the elevator O. The transfer finger for accomplishing this is shown in Fig. 14 and is seen to consist of two parts,—the finger $l^{11}$ and the buffer $l^{12}$. The finger is here shown in its normal position, retained against the tension of the spring $l^{15}$ by the sliding release pin $l^{13}$ which engages a suitably formed catch, $l^{14}$, pivoted and spring held on the upper part of the finger $l^{11}$. This release pin has a limited endwise motion, and is formed with a reduced diameter about midway of its length. The advance of the mold before each casting operation drives this pin forward as the front face of the mold cover plate encounters its projecting end, bringing the reduced portion opposite to the detaining catch $l^{14}$, and thus allowing the finger to move forward under the tension of the spring $l^{15}$ far enough to free itself from the catch. In so freeing itself it encounters the outer face of the projecting jaw $m^{12}$ of the mold. Against this it banks for a brief space while the casting operation is going on. As soon, however, as the mold withdraws far enough to free the finger, the latter pushes the line unit ahead of it out of the shift carriage L into the first elevator O, as indicated by the dotted lines in Fig. 14. A projection, $l^{10}$, upon the side of the shift carriage link $l^{10}$ engages the adjacent face of the finger $l^{11}$ during the rise of the carriage, and thus restores the finger to its normal position before the carriage descends with the next line unit.

The molten metal from which the lines of type are cast is contained in the metal pot P, and is heated and kept at the proper temperature by the usual, or any suitable, heating apparatus.

The metal pot P is shown variously in Figs. 4, 5 and 6, and is also shown, together with its supporting brackets in sectional elevation in Fig. 32. The supporting brackets are represented by $p, p^1, p^2, p^3$, and are located so as to support the pot P on opposite sides,—being secured on one side to the vertical face of the mold slide $N^1$ and on the other side to the frame of the machine.

From the pot casing project suitably opposed lugs upon which are mounted anti-friction rolls $p^4, p^5, p^6, p^7$, in such manner as to engage longitudinal grooves in the brackets and thus support the pot P in the desired position. Thus mounted in the machine the pot is free to reciprocate to and fro in the usual way, while it is readily removable at the will of the attendant. The mechanism for reciprocating the pot and controlling its movements will be described hereafter. During the casting operation the molten metal is forced from the interior of the pot P into the mold by the downward movement of the plunger $p^8$ in the pot well $p^{11}$.

Coming now to the details of the driving mechanisms, I refer to Figs. 4, 5, 6, 13, and 35, 36 and 37. The driving shaft R is shown in elevation in Fig. 13, supported in bearings $a^1$ and $a^2$ secured to the machine frame A. The driving pulley $r$ is shown on the outer end of the shaft. With the interior face of the pulley flange a friction clutch may coöperate in the manner usual in this class of machines, with the usual or any suitable connections for stopping and starting the machine manually. The machine may be also equipped with the usual automatic stopping and starting devices common to this class of line casting machines. The driving shaft R is constructed as usual in two parts, with the driving pinions and their coöperating sliding clutch mounted upon the smaller member. Next to the bearing $a^1$ and freely revolving upon the shaft R is the main driving pinion $r^1$. This pinion meshes with the main driving gear $r^2$ as shown in Fig. 4, and the latter is, in common with the main driving cams, secured to the main shaft $r^3$. A second pinion gear $r^4$ is also mounted to revolve freely upon the shaft R, and in the space between these two pinion gears $r^1$ and $r^4$ slides the double-faced clutch $r^5$, key-connected to the shaft R, and capable of being slid along it and operatively engaged with either one of the pinions; these latter being provided upon their adjacent engaging faces with the necessary complementary projections and recesses to coöperate with the faces of the clutch $r^5$. In the outer circular face of the clutch a circumferential groove $r^3$ is formed, and into this groove from opposite sides enter the pins $r^7$ projecting from the clutch lever $r^6$. These pins with the coöperating groove form the means by which the movements of the lever $r^6$ are transmitted to the clutch, and the latter slid along the shaft and engaged as desired with either pinion gear. The clutch lever is pivoted, as shown in Figs. 4 and 5, at its lower and rearward end to a boss $a^3$ rising from the frame of the machine; and it is so formed as to encircle the clutch disk, the latter supporting it in its rising, inclined position. A spring, $r^9$, tends constantly to draw this lever toward the pinion gear $r^1$ so as to engage the face of the clutch $r^5$ with the coöperating face of the pinion. On the forward end of the lever is pivoted the finger $r^{10}$, standing normally at right angles to the lever. A cam surface, $r^{11}$, projects from the adjacent vertical face of the main gear $r^2$ in such opposing relation to the finger $r^{10}$ that as the main gear rotates this cam surface engages the end $r^{12}$ of the finger, driving the clutch lever away from the gear to the position shown in dotted lines in Fig. 5, and thereby disengaging the clutch $r^5$ from the pinion $r^1$ and causing it to engage with the face of the pinion $r^4$. In this manner the rotation of the main gear $r^2$ is made to effect at a prescribed time the disengagement of the clutch with its driving pinion, thus stopping the main cam shaft; while the same movement of the clutch away from the pinion $r^1$ effects its engagement with the pinion $r^4$, thus starting the secondary driving mechanism.

It may be here remarked that when the line of matrices and spacers is composed in the assembling elevator D, and the latter lifted to its upper position, the release of the line transfer carriage G G$^1$ starts the machine in the usual way. The driving clutch $r^5$ engaging with the pinion $r^1$, the main cam shaft begins its regular rotation. The line confining and justifying operations and the subsequent movement of the line transfer carriage to the left are each governed and controlled by their appropriate cams on this shaft. Its stoppage in the manner just described is timed to occur after the justification of the line, and as soon as the latter has been moved by the transfer carriage to the left so that the ears of the first matrix in the line are banking against the detaining shoulder plates $l$. The driving pinion $r^4$ which is now engaged with the clutch $r^5$ is in mesh with the gear S of the secondary mechanism and thus brings into action the line subdividing and unit-casting devices before described. In Figs. 35, 36 and 37 are shown clearly the actuating members of this secondary mechanism. They consist of the spur gear S, the cams $s^{10}$, $s^{11}$, $s^{12}$, and the miter gear $s^{13}$ all secured to the shafts $s^{14}$. Bearings $a^4$ and $a^6$, springing from a common base $a^7$ secured to the machine frame, support this shaft as shown in Fig. 4. The miter gear $s^{13}$ transmits motion to its fellow $s^{17}$, the latter gear being mounted firmly on the shaft $s^{15}$ and supported by the bearing $a^8$ as shown in Fig. 4. To the other end of this shaft $s^{15}$ is secured the gear $s$ which drives the rotary mold carrier N.

The horizontal reciprocating movements of the mold slide N$^1$, the metal pot P, and the ejector Q are in each case governed by the vertical movements of a toggle-arm member. In the case of the pot P and the mold slide N$^1$, the arrangement of the parts is very similar,—the toggle-arm member being connected to a cam rod rising from the face of the cam on the secondary mechanism,—while the toggle-arm connected to the ejector Q is connected to a rod actuated from a pin projecting from the side of the spur gear S. In the case of the pot plunger $p^8$, the lever to which it is connected is operated directly through the cam rod from the cam face. These parts will now be described in detail.

Upon the upper portion of the bearing $a^4$ is fastened the guide bracket T, supporting and guiding the cam rods $t$, $t^1$, $t^2$, as shown in Fig. 36. The lower ends of these rods are provided with yokes or forks within the arms of which cam rolls are mounted, their close engagement with the corresponding cam face being preserved by means of the extension springs $t^3$, $t^4$, and $t^5$. Permanent braces, $a^9$, $a^{10}$, and $a^{11}$, secured to the frame by the fixed shaft $a^{12}$, and encircling the main cam shaft at their upper ends so as to be supported thereby, are provided at these upper ends with projecting ears or lugs to which in each case one of each pair of toggle-arm members is pivoted, as shown.

Referring to Fig. 4, $t^6$ and $t^7$ represent the toggle links which govern the reciprocating movements of the metal pot P. One end of $t^6$ is pivoted to the brace $a^9$, and one end of $t^7$ is pivoted at $t^8$ between a pair of lugs projecting from the rear vertical face of the pot casing and forming a part thereof. At their other ends the links are pivoted together in the yoke $t^9$ mounted upon the upper end of the cam rod $t^2$. With the starting of the secondary mechanism, the cam $s^{12}$ begins to rotate and will at the prescribed time force the cam rod $t^2$ upward, the links $t^6$ and $t^7$ straightening themselves relatively, and driving the metal pot P forward in so doing. The return movement of the toggle links downward is aided and facilitated by the contractile spring $t^{10}$, and by the extension spring $t^5$ below the guide bracket T.

The mold slide N$^1$ being reciprocated by a similar arrangement of links, rod and cam, it will not be necessary for an understanding of its mode of operation to describe its action.

The pot plunger $p^8$ is connected by the link $p^9$ to the vibrating lever $p^{10}$, the latter being secured to the shaft or rod $p^{12}$, rotatable in its bearing in the machine frame. From a projecting spring finger, $p^{13}$, secured also to the rod $p^{12}$ but at its opposite end, is suspended the contractile spring $p^{14}$, fastened at its lower end to the machine frame and tending constantly to draw the lever $p^{10}$ downward. Midway of the length of this lever the upper end of the cam rod $t^1$ is connected, the roll at its lower end resting upon the cam $s^{11}$ and thus communicating to the plunger $p^8$ the rise and fall of the roll generated by the varying contour of the cam face.

The manner in which the toggle-link connected to the ejector Q is made to reciprocate the latter is shown very clearly in Figs. 36 and 37. From the vertical face of the gear S projects the pin $s^{16}$ in the circular pathway of which stands the rod $t^{11}$, connected at its upper end to the links $t^{12}$ and $t^{13}$ and held downwardly by the contractile spring $t^{14}$ connecting its lower end with the frame of the machine. The projecting end of the shaft $s^{14}$ serves to some extent as a guide and stop for this rod. As the gear rotates the pin $s^{16}$ passes beneath and into a recessed portion $t^{15}$ of the rod $t^{11}$ and fits it,—the spring $t^{14}$ tending to make the rod preserve the generally vertical character of this lifting movement,—as seen by the dotted lines in Fig. 37 at its fullest extent. The rod's movement laterally is confined between the shaft $s^{14}$ at the right and a downward projection $t^{17}$ from the bracket T at the left, preventing accidental disengagement. As the pin passes from beneath the rod $t^{11}$, the latter falls to its former position, aided and facilitated in so doing by the springs $t^{14}$ and $t^{16}$.

The complete cycle of movements which the various actuating cams and gear trains of the secondary mechanism are formed and timed to generate in proper sequence is as follows: The mold carrier N is rotated one-quarter turn, making, as it does so, the line-subdivision and unit transfer movements. The mold slide $N^1$ bearing the mold carrier N then begins to advance, followed closely by the metal pot P, and by the ejector Q. As soon as the "lock-up," as it is called, of the matrix, the mold, and the metal pot is complete, the pot plunger drops in the pot well forcing the molten metal into the mold to make the cast. At the same instant the ejector blade passes through the mold positioned in front of it and ejects the type previously cast. The plunger is then raised, and the pot begins its rearward movement, followed by the mold slide and by the ejector, until all the parts have reached the positions in which they were at the beginning of the cycle. The compact form of the moving parts concerned, their small size and weight, and the character of the connections between them and their actuating mechanism, taken altogether, makes it possible to operate them at very high speeds and with great rapidity of action.

When the last unit in the line has been transferred from the channel I to the casting point and thence to the first elevator O, wherein the rest of the line is stored, the shaft carriage L will, in the succeeding cycle, make its usual upward movement but will return empty. The mold being immediately presented to it for the casting operation, and there being this time no line-unit interposed in the pathway of the jaw $m^{13}$, the mold cap will be free to slide the full width of the mold cell and the jaws will contact together. The mold cell being thus closed against the molten metal, no cast is made, although the type cast during the preceding cycle will be duly ejected as usual from its mold. This full movement of the mold cap entirely across the mold cell is taken advantage of and utilized to effect indirectly the stoppage of the secondary mechanism as it comes to the end of that cycle of operations in which such full movement of the mold cap occurs, and to effect co-incidently the starting of the main cam shaft.

In Figs. 4 and 5 is shown a small finger lever U pivoted at a point near one of its ends to the bracket $a^{13}$ upon the machine frame. From the shorter end of this lever projects a lug $u$ carrying an adjusting screw or other means adapted to aline with the ram $m^{14}$ when the mold is in the forward position and to contact lightly with it when the smallest line unit is held in position between the mold jaws. The adjustment of this finger is thus such that it will not be operated or moved except by that slight extra movement of the mold cap to the right which occurs only whenever no line unit is interposed between the mold jaws and the latter are thus allowed to contact. To this finger lever U is connected, by the link $u^1$, another finger $u^2$ secured to the upper end of a rod $u^3$ carried vertically in suitable bearings on the machine frame. To the lower end of this rod is fastened another finger lever $u^4$ and to its extremity a link $u^5$ is freely connected. This link extends horizontally rearward in the guides $u^6$ beneath the mold slide $N^1$ to a point near the secondary mechanism. At its rear end is connected the spring finger $u^7$, formed with a recess $u^8$ upon its under face to engage the pin $u^9$ projecting from the upper end of the drop pawl $u^{10}$. This drop pawl is pivoted near its middle in a projection rising from the end of the arm $u^{12}$, the latter being connected at its other end with the finger $r^{10}$ on the end of the clutch lever $r^6$. The arm $u^{12}$ is guided in the bracket T and lies directly over the gear S in such a way that the lower end of the drop pawl $u^{10}$ is free to swing into the pathway of the pin $u^{11}$ projecting from the side of the gear. During the regular rotation of the secondary mechanism the drop pawl $u^{10}$ is held out of engagement with the pin $u^{11}$ as shown in Fig. 41. As soon, however, as the entire line has been transferred to the first elevator, there will occur that slight movement of the mold cap to the right described above, and this movement communicated and compounded by the system of levers and links carries the link $u^5$ rearwardly sufficient to allow the lower part of the drop pawl $u^{10}$ to swing into the pathway of the pin $u^{11}$ upon the gear S, as shown in Fig. 42.

As the gear rotates the pin encounters the pawl, carries it around its pivot point into a more vertical position, and then draws it forward together with its associated parts to the position shown in Figs. 4 and 5. The effect of this forward movement of the arm $u^{12}$ is to disengage the finger $r^{10}$ from the cam surface $r^{11}$ on the main gear $r^2$. The clutch lever $r^6$ is immediately drawn back into its original position by the spring $r^9$,—disengaging the driving clutch $r^5$ from the secondary driving pinion $r^4$ and engaging it with the main driving pinion $r^1$,—thus stopping the secondary mechanism and starting the main cam shaft again in its interrupted movement. As the main gear $r^2$ rotates, the cam surface $r^{11}$ recedes, and the connecting spring $u^{13}$ on the finger $r^{10}$ and the arm $u^{12}$ is left free to carry these parts back to their former position in readiness for the next and succeeding cycle of movements.

The first elevator O. which contains within it the entire line of matrices and spacers and which is operated from the cam $O^1$ in the usual manner, is now raised to the upper position shown by the dotted lines in Fig. 1 that the line may be transferred to the intermediate channel V and there disintegrated in the usual way. Just before it rises, however, the line transfer carriage finger G is moved slightly to the right by its controlling cam $g^1$, and, upon the descent of the elevator to its lower position, this carriage is moved fully to the right until it occupies its original position above the assembling elevator D, in readiness to receive the next composed line.

The cams $J^1$ and $K^1$ shown in Fig. 5 operate through the levers $j$ and $k^{11}$ respectively—the levers being spring-held constantly against their respective cam faces in any suitable way,—to lift and depress the rods $j^1$ and $k^{12}$ shown in Fig. 1, thus actuating by means of the pivoted links $j^2$ and $k^{13}$ the line-confining frame J and the justification bar K in their required and appropriate movements.

From the cam represented by W and shown in Fig. 5 in its position upon the main cam shaft is operated the usual lever by means of which the line of matrices is raised from the intermediate channel V to the distributer mechanism.

The movements and operations of all the various parts and members may now be summarized and described as follows: The line of matrices and spacers is composed in the assembling elevator D as usual, and the latter is then raised to its upper position, thereby releasing the line transfer carriage G $G^1$—between the depending fingers of which the line is at once carried into the channel I and there held in position—and thus starting the machine in the regular way. The clutch $r^5$ being at the moment in engagement with the main driving pinion $r^1$ the main cam shaft begins at once to rotate and the operations of line-confining and justification are effected from the cams $J^1$ and $K^1$. During the justification the step $k$ is raised to the height corresponding to the extent of the rise of the justification bar K, remaining in this position after the frame J and the bar K have both descended to their lower positions. The cam $g^1$ now allows the line transfer fingers G $G^1$ to move farther to the left until the line is in position for subdivision, and immediately afterward the cam surface $r^{11}$ on the main gear $r^2$ throws the clutch $r^5$ out of engagement with the main driving pinion and into engagement with the driving pinion of the secondary mechanism, thus stopping the one and starting the other. The mold carrier makes one quarter of a turn, during which the shift carriage rises to the line and the unit transfer takes place. The mold slide advances, and the line unit is clamped between the confining jaws of the mold. Meanwhile the pot and ejector have advanced, and the "lock-up" takes place, the type being cast and the previously-cast type being ejected at the same time. The mold recedes and as it does so the transfer finger pushes the line unit from the shift carriage into the first elevator O. The mold slide, the ejector, and the pot recede fully and the cycle is complete. The mold carrier makes another quarter of a turn, beginning a new cycle and so on,—the operations proceeding successively until the last line unit has passed the casting point. In the next and idle cycle which occurs after this has been accomplished, the sliding mold cap closes the mold cell entirely, and in so doing encounters a finger on lever U which communicates this slight abnormal movement to a drop pawl $u^{10}$ lying normally in an inoperative position out of the pathway of a pin traveling on the side of the gear S. The pawl swings into the pathway of the pin, the latter encounters it and moves it in a forward direction, thereby effecting the disengagement of the driving clutch $r^5$ from the driving pinion of the secondary mechanism, and allowing it to reëngage with the main driving pinion,—thus stopping the secondary mechanism and re-starting the main cam shaft in its interrupted rotation. The line transfer carriage finger G now moves slightly to the right, the elevator O containing the line of matrices and spacers rises and the line is transferred to the intermediate channel V and there disintegrated as usual. The elevator O descends to its lower position, and the transfer carriage G G¹ moves fully to the right to its normal position above the assembling elevator D. The machine is then stopped by the usual devices.

X represents the separate, cast types and spaces which, upon being ejected from the mold, are driven by the ejector Q along the channel $q^1$, and are successively assembled in series of lines in the galley Y in the manner illustrated in Figs. 38, 39 and 40 and now to be described. As each type or space is ejected it is left in position at the front extremity of the channel $q^1$ directly in front of the inwardly projecting portion $y^1$ of the vertical, vibrating lever $y$, and is then pushed ahead by this lever a short distance on to the sustaining plates or shoulders $y^2$ and $y^3$ which project inwardly from back and front in the upper part of the galley, between the galley front and rear walls or plates $y^4$ and $y^5$. This vibrating movement of the lever $y$ is similar to that of the slug lever at present in use on the commercial machines of this class, and may be actuated by any suitable connection from the reciprocating mold slide or other moving member of the machine. When all the types and spaces constituting a complete line have been cast and ejected, and have been assembled by the lever $y$ in an orderly line, as cast, upon the horizontal sustaining plates $y^2$ and $y^3$, the upward movement of the first elevator O as it rises to transfer the line to the intermediate channel causes the cam piece $o^1$ secured to the elevator slide $o$ to be carried against the roll $y^{16}$ upon the end of the pivoted finger $y^{15}$. The immediate effect of this inward movement of the upper part of the finger $y^{15}$ is shown in Fig. 40, and may be somewhat anticipated and summarized as follows: The horizontal, type-line supporting platform $y^{10}$ carried upon the upper end of the rod $y^{11}$ drops a certain prescribed distance, and immediately afterward the sustaining plates $y^2$ and $y^3$ are withdrawn from beneath the line of types, allowing them to drop upon the platform $y^{10}$ as shown. As soon as the elevator O descends, the finger $y^{15}$ returns to its former position under the outward pressure of the spring $y^{19}$, and the two sustaining plates $y^2$ and $y^3$ are moved inwardly toward each other to their former type-supporting positions by the springs $y^{20}$ and $y^{21}$, in readiness to receive the next line of types.

The actuating finger $y^{15}$, pivoted at its lower end in the bracket $y^{22}$ fastened to the front galley plate $y^4$, is retained in its position by the outward pressure of the spring $y^{19}$—the latter being guided in suitable and corresponding recesses in the finger and in the bracket—against the resistance of the flat link $y^{23}$, pivoted at $y^{24}$ and formed with an elongated hole through which the shaft $y^{13}$ passes. When the cam piece $o^1$ has moved the finger $y^{15}$ inwardly, the ratchet pawl $y^{17}$, pivoted at $y^{24}$ to the finger and having a limited movement thereon, engages the ratchet wheel $y^{18}$ secured to the shaft $y^{13}$ causing the latter to partly rotate in its bearings $y^{14}$. To this shaft is secured also the pinion gear $y^{12}$ which meshes with the rack formed on the front of the rod $y^{11}$, so that the rotative impulse imparted to the ratchet and communicated through the pinion gives the rod a prescribed downward movement; this movement being, upon the return of the finger $y^{15}$, effectually limited by a side teat formed upon the end of the flat link $y^{23}$ locking with the teeth of the ratchet wheel and preventing its rotation. Suitable bearings, secured upon the rear galley plate $y^5$ but not shown in the drawings herewith, serve to guide the rod $y^{11}$ in its vertical movements.

Two pairs of vertical fingers, $y^{27}$, $y^{28}$, and $y^{29}$, $y^{30}$, are secured to the respective shafts $y^{25}$ and $y^{26}$, these shafts being mounted in bearings upon the front and back galley plates in such manner as to allow the fingers to vibrate to and fro. To the upper end of each pair of fingers are freely secured by the rods $y^{31}$ and $y^{32}$ the retractable plates $y^2$ and $y^3$ upon which the type lines are sustained. The two fingers at one end are freely connected together at their extended lower portions by a pin $y^{33}$ in such a way as to move simultaneously, and both pairs are further connected at their upper ends by the springs $y^{20}$ and $y^{21}$.

About the middle portion of the front shaft $y^{25}$ the finger $y^{25}$ is secured. With this finger the roll $y^{16}$ contacts during the latter part of its inward movement, and in this way the two pairs of vertical fingers are rocked away from each other, and the type-supporting plates $y^2$ and $y^3$ are withdrawn sufficiently from beneath the type line which they carry to allow the types to fall a short distance through between them on to the supporting platform $y^{10}$. This operation, repeated for each line of types cast, results in the accumulation upon the platform $y^{10}$ of a number of lines of type; to remove these from the galley, the end gate $y^6$ is unlatched, the galley slightly inclined, and the types allowed to slide out in a body upon the gate as it lies horizontally.

Having described my invention, I claim and desire to secure by Letters Patent:

1. In a machine for casting and setting type in justified lines, expansible spacers, and matrices having their operative edges of a thickness equal to the setwise thickness of the type required, in combination with means for assembling said matrices and spacers in line, means for adjusting the spacers in the line to justify the same, a type mold variable in width, and means for presenting the parts of the composed line successively edgewise to the mold, the adjustment of the mold being determined by the setwise thickness of the matrices and spacers, substantially as described.

2. In a machine for casting and composing justified lines of type, the combination of circulating matrices and spacers, means for selecting and assembling them in line, means for adjusting the spacers in line to justify the same, a series of successively operative type molds, each controllable in width by the matrices or spacers presented thereto, and means for presenting the individual matrices and spacers from the composed line to the successive molds.

3. In a type casting machine, a series of type molds variable in width by matrices and spacers presented thereto, and means for presenting to said molds in succession the individual spacers and matrices from a composed line; whereby the molds are caused to cast type and spaces corresponding in width to those in the matrix line.

4. In a type casting and composing machine, the combination of a rotary series of molds, each variable in width setwise, a series of flat matrices each having the matrix proper in one edge, and having said edge of a thickness equal to that of the type required therefrom, and means for presenting the matrices in order to the successive molds.

5. In a type casting and composing mechanism, a composed line of expansible spacers, and matrices having their operative edges of thicknesses corresponding to the width of the type required, said line having a length equal to that of the required line of type, in combination with means for casting individual type, and means for transferring the matrices and spacers one-at a time from the composed line to the casting mechanism and presenting them edgewise thereto, said casting mechanism including a mold controlled in width by the setwise width of each matrix and spacer presented thereto.

6. In a mechanism for producing justified lines of type, matrices having a thickness setwise equal to that of the required type and spacers having a width setwise equal to the required spaces in the line, together with means for assembling the said matrices and spacers in proper order; in combination with a type mold adjustable setwise, means for presenting the assembled matrices and spacers successively and individually edgewise to the mold, means for automatically opening the mold, and means for automatically closing the mold against the side faces of the matrices and spacers; whereby each matrix and spacer is enabled to directly determine the width of the body cast against the same in the mold.

7. In a machine for casting and setting type in justified lines, justifying spacers, matrices having their operative edges of thicknesses corresponding to the respective type, means for assembling the matrices and spacers in line and adjusting the spacers to justify the line of type, a mold variable in width, and means for transferring the individual matrices and spacers to the mold and presenting the side faces used for determining the justification, to determine the adjustment of the mold.

In testimony whereof I hereunto set my hand this 18th day of June, 1909, in the presence of two attesting witnesses.

PHILIP T. DODGE.

Witnesses:
E. J. LAMB,
A. KUNZ.